United States Patent [19]
Maeda

[11] Patent Number: 5,276,544
[45] Date of Patent: Jan. 4, 1994

[54] TWO ELEMENT OPTICAL SYSTEM FOR FOCUS ERROR CORRECTION IN LASER SCANNING SYSTEMS

[75] Inventor: Patrick Y. Maeda, Redondo Beach, Calif.

[73] Assignee: Xerox Corporation, Stamford, Conn.

[21] Appl. No.: 982,330

[22] Filed: Nov. 27, 1992

[51] Int. Cl.$^5$ .............................................. G02B 26/08
[52] U.S. Cl. ....................... 359/196; 359/201; 359/210; 359/216; 250/201.4; 250/236
[58] Field of Search ............... 359/201, 196, 216, 217, 359/218, 219, 205, 206, 209, 210, 213, 214, 215, 221; 250/235, 236, 201.4, 201.2

[56] References Cited

U.S. PATENT DOCUMENTS

| | | |
|---|---|---|
| 4,838,632 | 6/1989 | Manian .................. 359/221 |
| 5,054,866 | 10/1991 | Tomita et al. ............. 359/201 |
| 5,055,663 | 10/1991 | Morimoto et al. ......... 250/201.4 |

Primary Examiner—Loha Ben
Attorney, Agent, or Firm—Fariba Rad

[57] ABSTRACT

A raster scanning system is disclosed which utilizes a focus error correction system for correcting a focus error both in the fast-scan plane and in the cross-scan plane without affecting the scan characteristics of the post polygon optics. The focus error correction system comprises at least two axially adjustable lenses. One of the lenses is spherical and the other is cylindrical in the fast scan plane. The spherical lens has to be adjusted first to correct the focus error in the cross-scan plane. Next, the cylindrical lens should be adjusted to correct the focus error in the fast-scan plane.

4 Claims, 3 Drawing Sheets

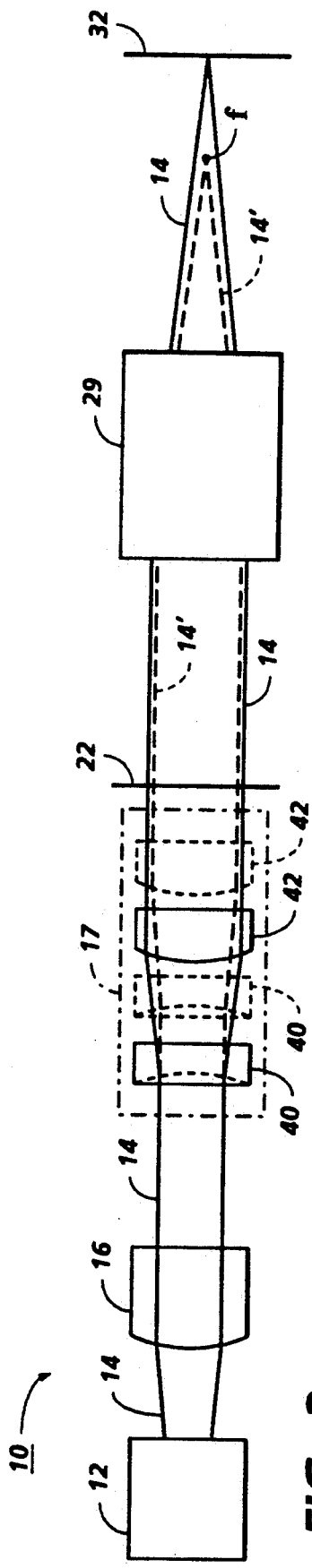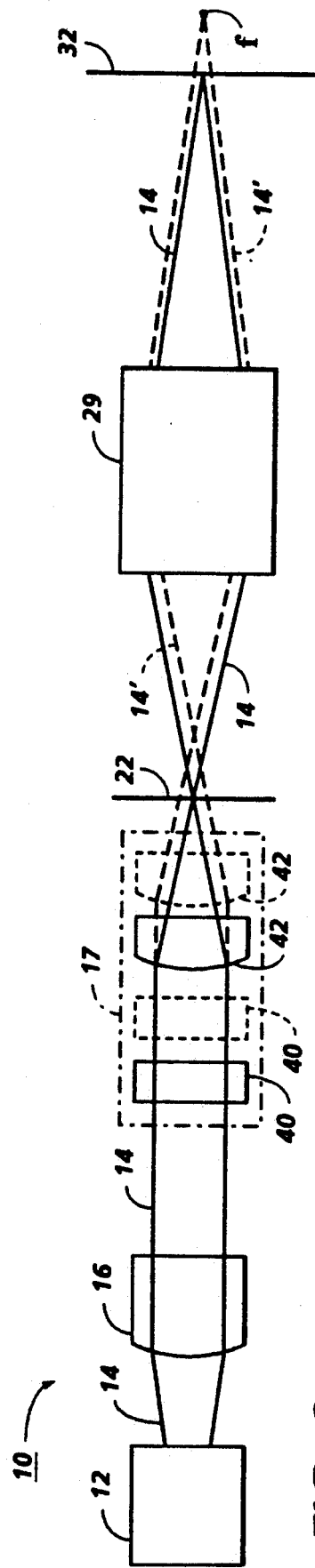
FIG. 2
FIG. 3

TWO ELEMENT OPTICAL SYSTEM FOR FOCUS ERROR CORRECTION IN LASER SCANNING SYSTEMS

BACKGROUND OF THE INVENTION

This invention relates to a raster scanner, and more particularly, to a raster scanner optical system which corrects a focus error caused by manufacturing tolerances of the optical elements of the raster scanner.

Raster scanner optical systems contained in the prior art have a light source, such as a laser, which emits a coherent light beam. The beam is collimated in both the fast-scan or tangential plane and in the cross-scan or sagittal plane by multiple optical elements. The collimated beam in the cross-scan plane is focussed at a point near a facet of a rotating polygon mirror by a cylindrical optical element while in the fast-scan plane the light beam remains collimated when the beam strikes the facet of the rotating polygon mirror.

The rotating polygon mirror causes the reflected beam to revolve about an axis near the reflection point of the rotating polygon mirror. This reflected beam can be utilized to scan a document at the input end of an imaging system as a raster input scanner or can be used to impinge upon a photosensitive medium, such as a xerographic drum (photoreceptor), in the output mode as a raster output scanner.

Typically, an optical element has manufacturing tolerances such as surface radii, element thickness or refractive index which can cause a slight deviation in the divergence of a light beam. In a raster scanner, which has a plurality of optical elements, the error caused by each optical element is cumulative. Consequently, manufacturing tolerances of the optical elements can substantially shift the focal point of the light beam from a point on the photoreceptor plane to a point outside of the photoreceptor plane which degrades the quality of the printed document.

Depending on the parameters of the raster scanner, the depth of focus, which defines the acceptable range of the focus error, varies. The low resolution raster scanners (i.e. 400 SPI) have a larger depth of focus compared to high resolution raster scanners (i.e. 600 SPI). Therefore, the low resolution raster scanners are more tolerant to the focus errors. On the contrary, the high resolution raster scanners are frequently impacted by the manufacturing tolerances of the optical elements. Usually, in a high resolution raster scanner with a small allowable depth of focus, the amount of the focus error is larger than the depth of focus.

To solve this problem, an option is to use optical elements with tight tolerances. However, this recourse is cost prohibitive and impractical.

Furthermore, the acceptable focus error in the fast-scan plane may be different than the focus error in the cross-scan plane. Since different optical elements are utilized to differentiate the light beam in the fast-scan plane from the light beam in the cross-scan plane, the conjugates in the fast-scan plane are different than the conjugates in the cross-scan plane. Therefore, the focus error in the fast-scan plane has to be corrected in a different manner than the focus error in the cross-scan plane.

Also, if the spot is elliptically shaped, the size of the spot in the fast-scan plane is smaller than the size of the spot in the cross-scan plane. Consequently, the allowable depth of focus in the fast-scan plane is smaller than the allowable depth of focus in the cross-scan plane which makes it more challenging to correct the focus error in the fast-scan plane than in the cross-scan plane.

Ordinarily, a pre-polygon cylindrical lens which only affects the light beam in the cross-scan plane is used to correct the focus error in the cross-scan plane. However, the focus error in the fast-scan plane remains unaffected. To "correct the focus error" as used herein shall mean moving the focus into the range defined as "allowable depth of focus" which is the acceptable range of the focus error.

It is an object of this invention to provide optical means to correct the focus error, caused by the manufacturing tolerances of the optical elements of the raster scanner, in both the fast-scan and cross-scan planes.

SUMMARY OF THE INVENTION

In accordance with the present invention, a focus error correction system is positioned between a collimator and a polygon of a laser diode raster scanner optical system. The focus error correction system, which comprises two axially adjustable lenses, provides an adjustment system to correct the focus error both in the fast-scan plane and in the cross-scan plane.

BRIEF DESCRIPTION OF THE DRAWINGS

FIG. 2 is a tangential view of the raster scanning system of this invention showing the optical elements in the focus error correction system;

FIG. 3 is a sagittal view of the raster scanning system of FIG. 2;

DESCRIPTION OF THE PREFERRED EMBODIMENT

Figure 1:
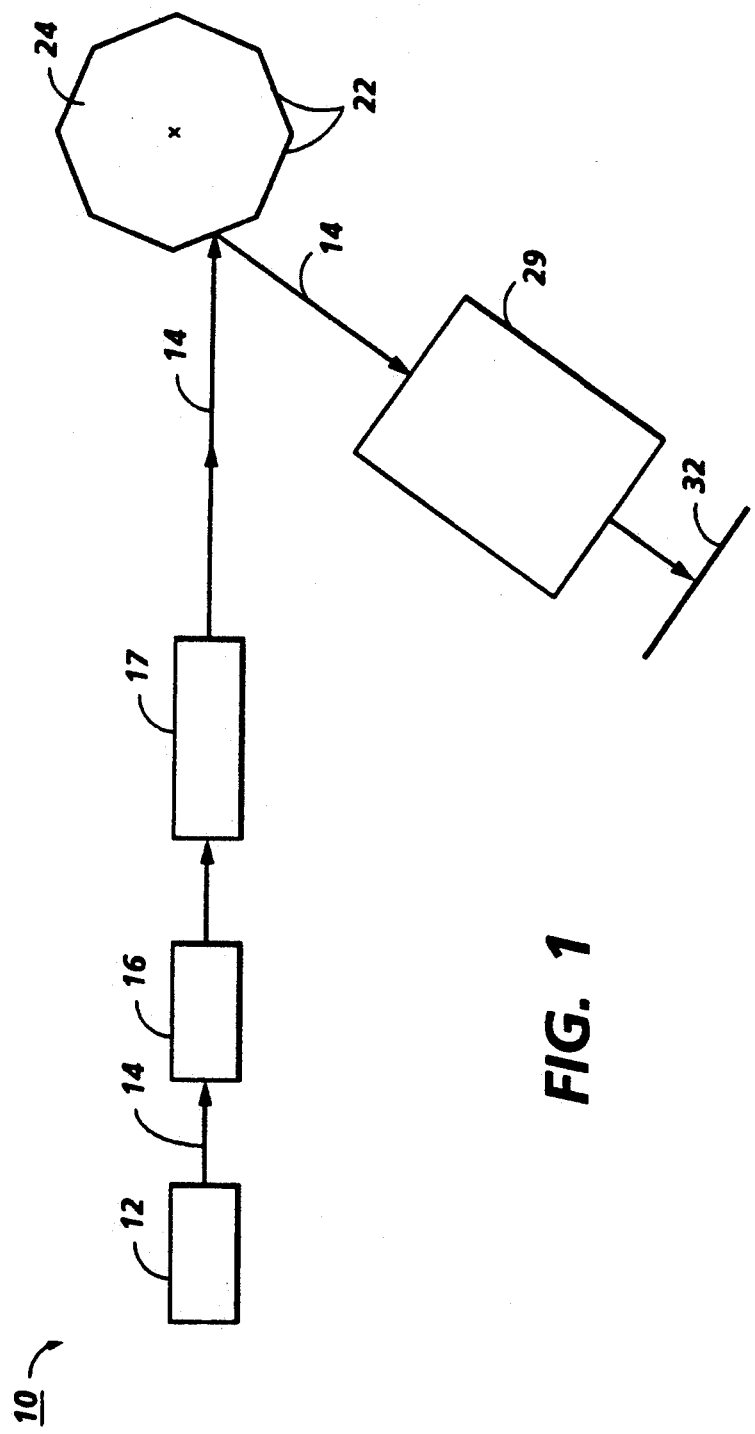
FIG. 1 is a tangential schematic view of a raster scanning system of this invention incorporating a focus error correction system.

Reference is now made to FIG. 1 wherein there is disclosed a raster scanner optical system 10. A laser diode light source 12 emits a coherent light beam 14 which is collimated in both the fast-scan and cross-scan planes by an optical collimator 16. The resulting collimated beam passes through a focus error correction system 17. The focus error correction system 17, which corrects the focus error caused by manufacturing tolerances of any of the optical elements of the raster scanner 10, will be described in greater detail hereinafter. In the cross-scan plane, the system 17 focuses the beam on a facet 22 of a multi-faceted rotating polygon mirror 24 while in the fast-scan plane the beam 14 remains collimated when the beam strikes the facet 22.

The beam 14 reflected from the facet 22 is still collimated in the fast-scan plane and is diverging in the cross-scan plane. The reflected beam 14 then passes through post polygon optics 29 which focuses the reflected light beam in both fast-scan plane and in the cross-scan plane on a photoreceptor plane 32. The post polygon optics are the common elements used in any raster scanning system.

Referring to FIGS. 2 and 3, a raster scanning system 10 of this invention which utilizes a pre-polygon focus error correction system 17 is shown. FIG. 2 shows a fast-scan or tangential view of the raster scanning system 10 and FIG. 3 shows a cross-scan or sagittal view of the raster scanning system 10. In both FIGS. 2 and 3, for the purpose of simplicity, the facet 22 of the polygon 24 is shown as lines 22 and the reflected beam from the facet 22 is unfolded.

The focus error correction system 17 comprises two axially adjustable lenses 40 and 42. The lens 40 is cylindrical in the fast-scan plane and planar in the cross-scan plane. The lens 42 is spherical, affecting the light beam in both the fast-scan and cross-scan plane.

In the fast-scan plane, when the collimated light beam 14 passes through lens 40 it diverges. Then the lens 42 collimates the previously diverging beam 14 and the collimated beam strikes the facet 22.

In the cross-scan plane, the collimated light beam 14 passes through the lens 40 unaffected since the lens 40 is planar. However, after passing through the lens 42, the previously collimated beam converges and the converging beam focuses on the facet 22.

In operation, due to the aforementioned reasons, the beam 14 may focus at a focal point outside of the photoreceptor plane 32. For example, the beam may focus at a focal point f outside of the photoreceptor plane 32. In both FIGS. 2 and 3, the dashed line 14' represents the light beam traveling through the raster scanning system 10 which is not adjusted to correct the focus error and the solid line 14 represents the light beam traveling through the raster scanning system 10 which is adjusted to correct the focus error. Also, the unadjusted positions of the lenses 40 and 42 are shown by dashed lines and the adjusted positions of the lenses 40 and 42 are shown by solid lines. As an example, in FIG. 2, the focus error is shown to occur before the photoreceptor plane 32 and in FIG. 3, the focus error is shown to occur beyond the photoreceptor plane 32. However, it should be noted that in both fast-scan plane and in the cross-scan plane the focus error can happen on either side of the photoreceptor plane 32.

By adjusting the adjustable lenses 40 and 42 of the focus error correction system 17, the light beam 14 can be refocused to have a focal point on the photoreceptor plane 32. The adjustment of either one of the lenses 40 and 42 can add a positive optical power or a negative optical power to the raster scanning system 10.

It should be understood that by adding a slight negative optical power or a slight positive optical power, the collimated beam may slightly diverge or converge. Also, due to the manufacturing tolerances, the light beam from the collimator 16 may slightly diverge or converge. For the purpose of simplicity, hereinafter a collimated beam which may slightly diverge or converge will be referred to as a "collimated beam". Also, in the drawings for the purpose of simplicity any collimated beam which may slightly diverge or converge is shown as a collimated beam.

In this system 17, since the lens 42 is a spherical lens and it affects the light beam in both planes, it has to be adjusted first to correct the focus error in the cross-scan plane. Then, the lens 40 which is concave only in the fast-scan plane can be adjusted to correct the focus error in the fast-scan plane. By adjusting the lens 40, any undesirable changes caused by the adjustment of the lens 42 in the fast-scan plane can be compensated in addition to correcting for errors due to manufacturing tolerances of the optical system. Adjusting the lens 40 does not affect the adjustment in the cross-scan plane. This principle has been illustrated in FIGS. 2 and 3.

It should be noted that the raster scanning system of this invention is capable of correcting focus errors caused by any pre-polygon or post polygon optical element used in the raster scanning system.

Figure 4:
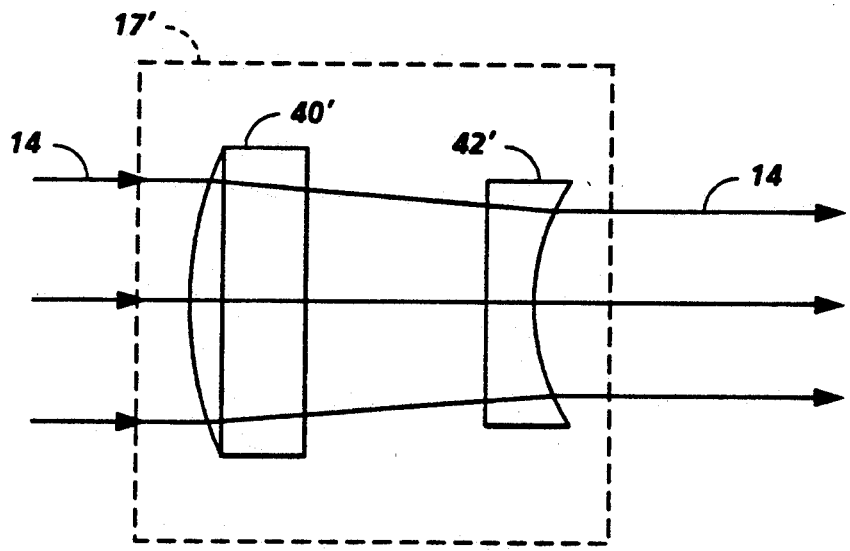
FIG. 4 is a tangential view showing the optical elements in an alternative focus error correction system.
Figure 5:
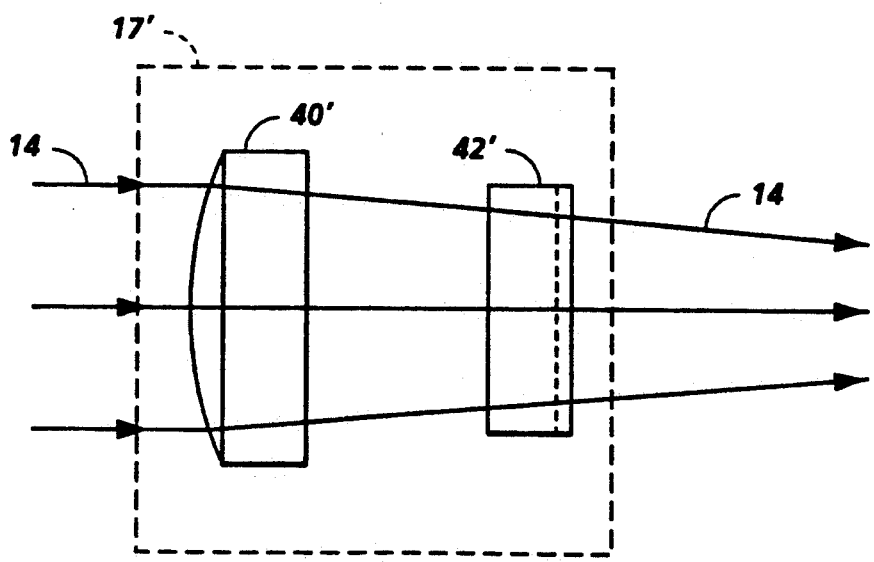
FIG. 5 is a sagittal view of FIG. 4.

Referring to FIGS. 4 and 5, there is shown an alternative focus error correction system 17' which comprises two axially adjustable lenses 40' and 42'. The lens 40' is spherical, affecting the light beam in both the fast-scan and cross-scan planes and the lens 42' is cylindrical in the fast-scan plane and planar in the cross-scan plane. In this system 17', the lens 40' has to be adjusted first to correct the focus error in the cross-scan plane and then the lens 42' can be adjusted to correct the focus error in the fast-scan plane without affecting the adjustment in the cross-scan plane.

The embodiment of this invention is capable of correcting the focus error without affecting the scanning characteristics of the post polygon optics. Utilizing the focus error correction system of this invention to correct the focus error, both in the fast-scan plane and in the cross-scan plane, does not substantially change the scan magnification of the raster scanner system and therefore, does not substantially change the spot size. Furthermore, this invention provides an adjustment in the pre-polygon optics to correct the focus error without affecting the scanning characteristics of the post polygon optics such as linearity of scan line or wobble correction.

In addition, the focus error correction system of this invention can be mechanized to correct any focus error automatically. The advantage of a mechanized focus error correction system is that the focus error caused by thermal and environmental changes which occur during operation can be corrected automatically. The automatic adjustment can be achieved through a sensor which senses the focus position and feeds back the amount of defocus to the alignment mechanism. Then, the alignment mechanism determines the amount of adjustment based on the amount of defocus and adjusts the adjustable lens.

What is claimed is:

1. A raster scanning system with focus error correction system comprising:

a light source for emitting a light beam;

collimating means in the path of the light beam for substantially collimating the light beam;

a medium;

a scanning means located in the path of the light beam and being so constructed and arranged to scan the light beam in a tangential plane across said medium;

a first axially adjustable optical means being located in the path of the light beam between said collimating means and said scanning means for diverging the substantially collimated light beam in the tangential plane;

said first axially adjustable optical means being planar in a sagittal plane whereby the substantially collimated light beam in the sagittal plane is substantially unaltered;

a second axially adjustable optical means being located in the path of the light beam between said first axially adjustable optical means and said scanning means for substantially collimating the diverging light beam from said first axially adjustable optical means in the tangential plane and for converging the substantially collimated light beam received from said first axially adjustable optical means in the sagittal plane; and post scanning optical means being located between said scanning means and said medium for receiving said light beam from said scanning means and focusing said light beam onto said medium in both the tangential and sagittal planes.

2. The structure as recited in claim 1, wherein said second axially adjustable optical means substantially focuses the substantially collimated light beam received from said first axially adjustable optical means in the sagittal plane onto said scanning means.

3. A raster scanning system with focus error correction system comprising:
   a light source for emitting a light beam;
   collimating means in the path of the light beam for substantially collimating the light beam;
   a medium;
   a scanning means located in the path of the light beam and being so constructed and arranged to scan the light beam in a tangential plane across said medium;
   a first axially adjustable optical means being located in the path of the light beam between said collimating means and said scanning means for converging the substantially collimated light beam in the tangential plane and in a sagittal plane;
   a second axially adjustable optical means being located in the path of the light beam between said first axially adjustable optical means and said scanning means for substantially collimating the converging light beam from said first axially adjustable optical means in the tangential plane;
   said second axially adjustable optical means being planar in a sagittal plane whereby the converging light beam in the sagittal plane is substantially unaltered; and
   post scanning optical means being located between said scanning means and said medium for receiving said light beam from said scanning means and focusing said light beam onto said medium in both the tangential and sagittal planes.

4. The structure as recited in claim 3, wherein said first axially adjustable optical means substantially focuses the substantially collimated light beam received from said collimating means in the sagittal plane onto said scanning means.

* * * * *